Oct. 26, 1965 R. BREUNING 3,213,717
ADJUSTABLE TOOL MOUNTING ARRANGEMENT, ESPECIALLY
FOR USE IN A BORING BAR
Filed April 26, 1963 3 Sheets-Sheet 3
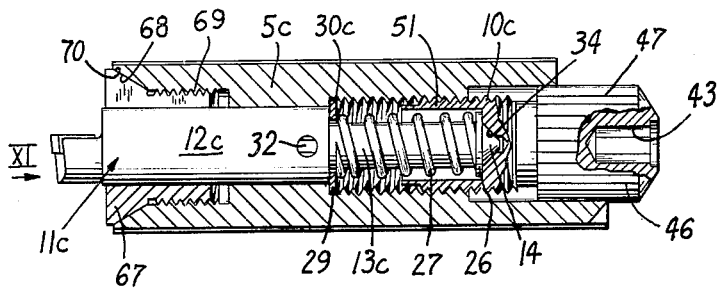
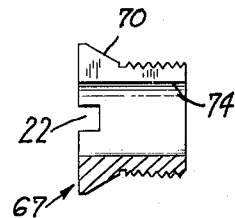
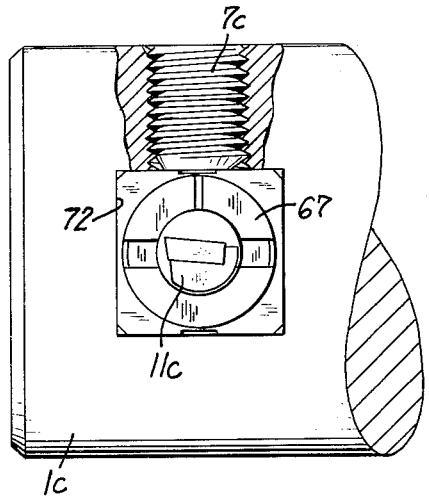
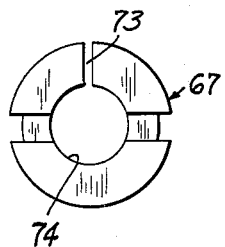
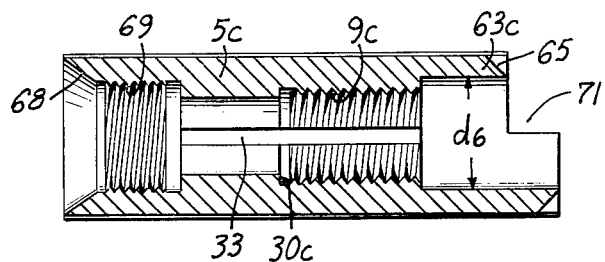
INVENTOR.
Robert Breuning
BY Michael S. Striker
Attorney United States Patent Office 3,213,717
Patented Oct. 26, 1965

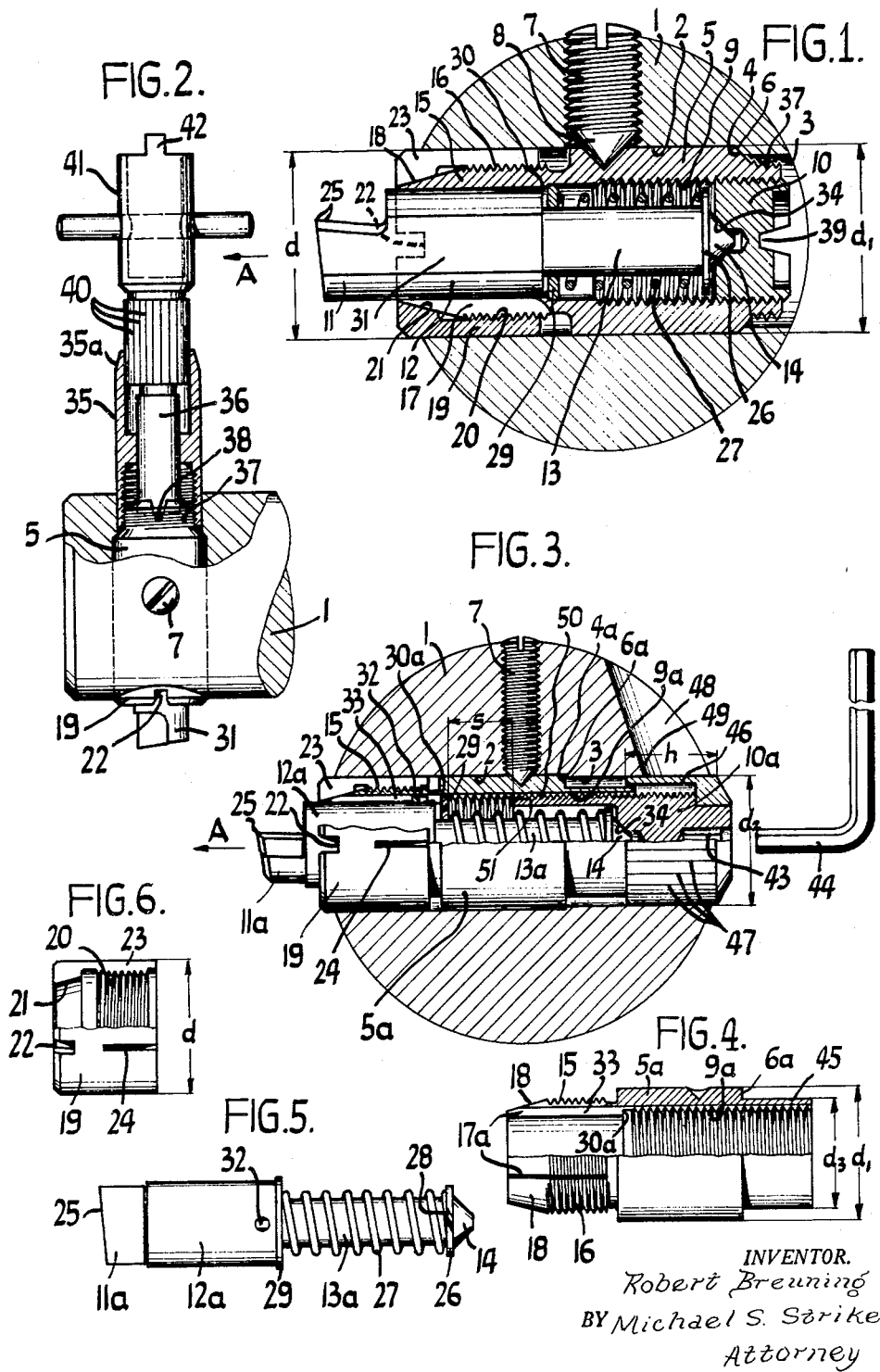

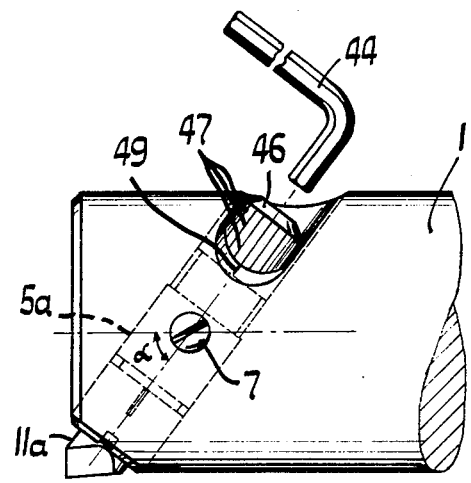
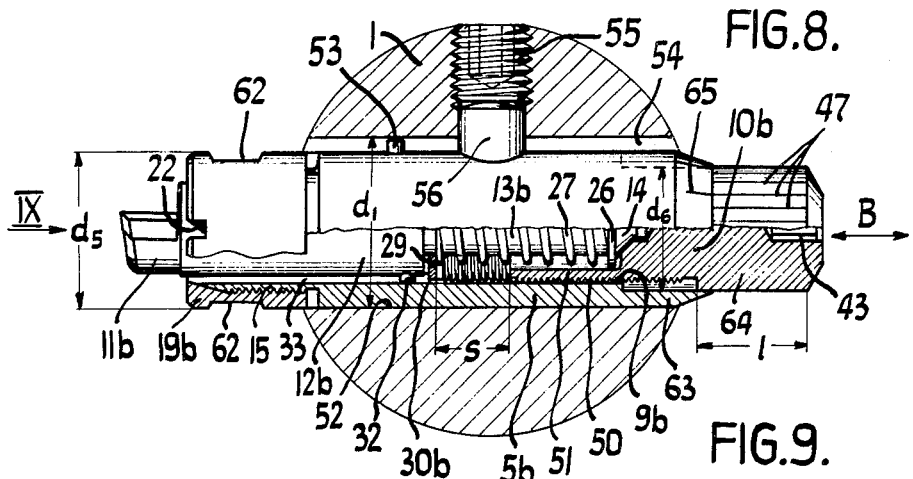

3,213,717
ADJUSTABLE TOOL MOUNTING ARRANGE-
MENT, ESPECIALLY FOR USE IN A BORING
BAR
Robert Breuning, Haupstrasse 58, Besigheim,
Wurttemberg, Germany
Filed Apr. 26, 1963, Ser. No. 276,023
Claims priority, application Germany, June 1, 1956,
B 40,479; Apr. 26, 1958, B 48,715, B 48,716
20 Claims. (Cl. 77—58)

The present application is a continuation-in-part application of the copending application Serial No. 812,756 filed May 12, 1959 and now abandoned.

The present invention relates to an adjustable tool mounting arrangement, and more specifically to an adjustable tool mounting arrangement used in combination with a boring bar. Such tool mounting arrangements are well known in the art and they usually comprise an elongated tool holding member clamped in a bore of a boring bar extending transverse to the elongation of the bar, and a cutting tool arranged in the elongated tool holding member for adjustment in longitudinal direction so that the working end of the cutting tool can be positioned at an exact location relative to the axis of the boring bar. Modern manufacturing technique requires an extremely exact adjustment of the cutting tool within very close tolerances which are to be held within a few ten thousandths of an inch and such an exact adjustment is very difficult to achieve and to maintain during operation of the cutting tool. A further important requirement to assure perfect working of the tool arrangement is to prevent any vibration of the cutting tool adjacent its working end which would detrimentally affect the precision of the work obtained by the tool arrangement.

It is an object of the present invention to provide for an adjustable tool holding arrangement in which the tool can be rigidly and securely clamped adjacent its working end, to prevent in this way any vibration of the tool adjacent the working end, to improve in this way the precision of the work obtainable from the arrangement.

It is a further object of the present invention to provide for an adjustable tool holding arrangement in which the adjustment of the cutting tool can be performed without any play and within tolerances of a few ten thousandths of an inch.

It is an additional object of the present invention to provide for such an exact adjustment of the cutting tool which will not be influenced or disturbed during proper clamping of the tool in the tool holding member or during subsequent application of working pressure on the working end of the tool.

It is yet another object of the present invention to provide for an adjustable tool mounting arrangement in which the adjustment of the position of the cutting tool can be carried out in an efficient manner, requiring a minimum of operations.

Finally, it is an object of the present invention to provide for an adjustable tool mounting arrangement which is composed of relatively few and simple parts so that the arrangement can be manufactured at very reasonable cost and will stand up properly under extended use.

With these objects in view, the adjustable tool mounting arrangement according to the present invention mainly comprises an elongated tool holding member defining in its interior an elongated axial passage and being formed in the region of one end thereof with a screw thread, a cutting tool slidably arranged in said passage and having a working end projecting beyond the other end of the tool holding member, stop means located in the one end of the tool holding member and threadedly engaging the screw thread formed therein so as to be adjustable in axial direction, spring means operatively connected to the holding member and to the cutting tool for pressing the end of the latter opposite the working end thereof against the stop means to eliminate thereby play between the engaging threads of holding member and stop means, so that an exact axial adjustment of the tool by turning the stop means will subsequently not be disturbed by pressure on the working end of the tool, and means for clamping the tool in radial direction at the other end of the tool holding member.

In this construction the spring means serves not only to hold the rear end of the cutting tool in positive engagement with the stop means, but the spring means serves also to eliminate any play between the cooperating threads of stop means and tool holding member during adjustment of the tool in axial direction, which is made while the tool is not in operation. This assures that the exact adjustment of the tool within the above mentioned extremely close tolerances will not be disturbed during subsequent application of working pressure on the working end of the tool. By clamping the tool in radial direction, adjacent the working end of the tool any vibration of the tool adjacent its working end is positively prevented and any disturbance of the exact position of the tool during its clamping is likewise positively avoided.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a longitudinal cross section through the adjustable tool mounting arrangement according to the present invention in which the tool holding member is shown arranged in a bore of a boring bar;

FIG. 2 is a partially sectioned view of the arrangement shown in FIG. 1 drawn to a smaller scale and showing an adjusting tool connected to the adjustable tool mounting arrangement;

FIG. 3 is a cross sectional view similar to FIG. 1 and showing a modification of the arrangement illustrated in FIG. 1;

FIGS. 4–6 are side views, partially sectioned, of various elements of the arrangement illustrated in FIG. 3;

FIG. 7 is a side view, drawn to a smaller scale, and showing the adjustable tool mounting arrangement according to FIG. 3 in a bore of a boring bar extending at an acute angle to the axis of the bar;

FIG. 8 is a partially sectioned side view similar to FIG. 1 and showing a further modification;

FIG. 9 is a partially sectioned end view of the arrangement shown in FIG. 8 and viewed in the direction of the arrow IX shown in FIG. 8;

FIG. 10 is a side view, drawn to a smaller scale and showing the adjustable tool mounting arrangement of FIG. 8 arranged in a bore of a boring bar extending at an acute angle to the axis of the bar;

FIG. 11 is a longitudinal section through a further modification of a tool mounting arrangement according to the present invention;

FIG. 12 is a partially sectioned end view of the arrangement shown in FIG. 11 viewed in the direction of the arrow XI of FIG. 11 and showing the tool mounting arrangement located in a boring bar;

FIG. 13 is a longitudinal section through the tool holding member of the arrangement shown in FIG. 11; and FIGS. 14 and 15 are respectively a longitudinal section and an end view of the clamping means of the arrangement shown in FIG. 11.

Since the various modifications illustrated in FIGS. 1, 3, 8 and 11 are constructed according to the same basic principles, the same reference numerals are used in the various figures for elements having the same function and corresponding elements of the arrangement shown in FIGS. 3, 8 and 11 are indicated with the same reference numerals as in FIG. 1 to which the letters $a$, $b$ or $c$ are respectively added.

The boring bar 1 illustrated in FIG. 1 is formed with a stepped bore 2, 3 extending substantially normal to the longitudinal axis of the bar and forming a shoulder 4. An elongated substantially cylindrical tool holding member 5 is located in the bore 2, 3 of the boring bar 1 and abuts with a shoulder 6 against the shoulder 4 of the boring bar. The tool holding member 5 is secured in the bore 2, 3 of the boring bar by a set screw 7 which penetrates with its pointed end 8 in a corresponding depression of the tool holding member 5. The tool holding member is formed with an axial bore therethrough which is provided in the rear portion thereof, shown in FIG. 1 as the right portion, with an inner screw thread 9 into which stop means in form of an adjusting screw 10 are threadedly engaged. A cutting tool 11 is slidably arranged in the bore of the tool holding member 5, which cutting tool has a working end provided with a cutting edge 25 projecting beyond the front end, or the left end as viewed in FIG. 1, of the tool holding member 5, a substantially cylindrical main shaft portion 12 rearwardly of the working end and a rear shaft portion 13 of smaller diameter than the main shaft portion. The end 14 of the rear shaft portion abuts against the adjusting screw 10.

The main shaft portion 12 of the cutting tool 11 is arranged in the front part 15 of the elongated tool holding member 5, which is constructed as a chuck. The front part 15 is for this purpose provided with an outer screw thread 16 and with a plurality of longitudinal slots 17 and at the free end thereof with an outer cone surface 18. A substantially cylindrical clamping sleeve 19 is arranged around the front portion 15 of the elongated tool holding member and the clamping sleeve 19 is provided with an inner screw thread 20 threadedly engaging the outer screw thread 16, and the clamping sleeve has at its front end an inner cone surface 21. The clamping sleeve 19 has an exterior diameter $d$ which is substantially equal to the exterior diameter $d_1$ of the cylindrical tool holding member 5. The clamping sleeve is provided at its front end thereof with cutouts 22 which are adapted to cooperate with corresponding projections on an adjusting key so that the clamping sleeve may be loosened or tightened as desired. The clamping sleeve 19 shown in the arrangement as illustrated in FIGS. 1 and 3 is preferably provided with a longitudinal slot 23 extending through the whole length of the sleeve and with a plurality of slots 24 extending in longitudianl direction only partly through the sleeve. During tightening of the slotted clamping sleeve 19 the cone surface 21 thereon cooperates with the cone surface 18 on the front portion 15 of the tool holding member for tightly clamping the main shaft portion 12 of the cutting tool in the front portion 15 of the tool holding member. The clamping sleeve 19 is thereby spread in transverse direction, due to the longitudinal slots 23 and 24 formed therein, so that the clamping sleeve is uniformly pressed substantially along the whole circumference thereof against the bore portion 2 in the boring bar 1. A rigid connection between the main shaft portion 12 of the cutting tool 11, the front portion 15 of the tool holding member 5, the clamping sleeve 19 and the boring bar 1 is thus obtained during tightening of the clamping sleeve so that the cutting tool is rigidly secured adjacent its cutting edge 25 in the boring bar. This will positively prevent any vibration of the working end of the cutting tool and thereby considerably improve the precision of the work obtainable from the arrangement. Despite the tight clamping of the cutting tool 11 it is possible to adjust the tool in direction of the arrow A by means of the adjusting screw 10, which is preferably provided with a fine thread, while the clamping sleeve is tightened, whereby the frictional resistance between the main shaft portion 12 of the cutting tool and the front portion 15 of the tool holding member has to be overcome. This possible advancement of the cutting tool in clamped condition greatly improves the accuracy to which the position of the tool can be adjusted. The possible adjustment of the tool 11 in its clamped position by means of the adjusting tool 10 is due to the fact that the clamped front portion 15 of the tool holding member exerts in clamped condition on the main shaft portion 12 of the tool a very uniform and relatively low specfic surface pressure.

Spring means in form of a coil compression spring 27 are arranged around the rear shaft portion 13 of the cutting tool, and the coil spring 27 abuts with opposite ends thereof respectively against an abutment ring 26 arranged at the rear end of the rear shaft portion 13 and against an additional abutment ring 29 slidably arranged on the rear shaft portion 13 and abutting with an outer peripheral portion thereof against a shoulder 30 formed in the bore of the tool holding member 5. The abutment ring 26 may be integrally formed with the rear shaft portion and in this case the ring 26 is preferably formed with an acute slot 28, as best shown in FIG. 5, so that the spring 27 may be threaded through the slot onto the rear shaft portion.

The above described arrangement has the advantage that the cutting tool 11 is continuously pressed by the compression spring 25 against the adjusting screw 10 so that any play between the outer thread of the adjusting screw and the inner thread 9 in the tool holding member 5 is taken up. This is especially important during the adjustment of the cutting tool in a direction opposite to the direction indicated by the arrow A. If such an adjustment is desired, the clamping sleeve 19 is loosened so that the shaft portion 12 of the cutting tool is free to move in the portion 15 of the tool holding member. During subsequent turning of the adjusting screw 10 in outward direction, the cutting tool will be moved rearwardly under the action of the compression spring 27 and thus be adjusted without play. If after such adjustment the clamping sleeve 19 is retightened, no axial displacement of the cutting tool will result, since the clamping sleeve does not abut against the cutting tool, but abuts with its cone surface 21 against the cone surface 18 of the portion 15 of the tool holding member which in turn will exert only radially directed pressure forces onto the shaft portion 12 of the cutting tool.

The cutting tool is secured in a known manner against rotation with respect to the tool holding member 5. The main shaft portion 12 in the arrangement shown in FIG. 1 is for this purpose provided with a flat 31 which cooperates with a corresponding flat in the portion 15 of the tool holding member. In the arrangement shown in FIGS. 3–5, on the other hand, the shaft portion 12a is provided with a pin 32 extending transverse to the shaft axis beyond the outer surface thereof and the projecting end of pin 32 is engaged in a corresponding longitudinal groove 33 (FIG. 3) formed in the front portion 15 of the tool holding member 5a.

The rear end of the rear shaft portion 13 is preferably in the form of a cone 14 which engages in a correspondingly shaped cone-shaped cavity 34 in the adjusting screw 10. This provides in addition to the clamping of the cutting tool at 12, 15 adjacent the front end of the cutting tool an additional fixed positioning at the rear end thereof, which further prevents any vibration of the cutting edge 25 of the tool and improves thereby the precision of the work performed by the tool.

FIG. 2 illustrates a guide sleeve 35 in which a turnable adjusting key 36 is guided for longitudinal adjustment of the cutting tool of the arrangement shown in FIG. 1. The guide sleeve 35 is screwed onto an outer screw thread 37 formed on the rear end of the tool holding member 5. The adjusting key 36 engages with a projection 38 thereof in a corresponding cutout 39 of the adjusting screw 10. The guide sleeve 35 is provided at 35a with a mark or with a vernier and the key 36 is provided with a scale 40 comprising a plurality of equally spaced longitudinal lines to provide for an exact adjustment of the cutting tool 11. The tubular formed end 41 of the key is provided with a pair of projections 42 which may be inserted, after removal of key 36 from sleeve 35, into corresponding cutouts 22 of the clamping sleeve 19 for tightening or loosening the latter.

In the arrangement shown in FIGS. 3, 8 and 11, on the other hand, the adjusting screws 10a, 10b, or 10c, respectively, are formed with a hexagonal depression 43 into which a correspondingly shaped key 44 may be inserted.

The cylindrical tool holding member 5a according to the arrangement illustrated in FIGS. 3 and 4 is provided at its rear end 45 thereof with an outer diameter $d_3$ which is smaller than the outer diameter $d_1$ of the main portion of the tool holding member. The adjusting screw 10a is provided with a cylindrical cap 46 having a length $h$ which is greater than the adjusting stroke $s$ of the tool, which is shown in FIG. 3 in its starting position adjustable in the direction of the arrow A. Cap 46 encompasses the rear end 45 of the tool holding member 5a and the outer diameter $d_2$ of the cap is preferably held slightly smaller than the outer diameter $d_1$ of the tool holding member 5a. The cap 46 prevents entrance of chips to the cooperating fine threads of the tool holding member 5a and the adjusting screw 10a. Cap 46 is provided at its outer surface thereof with a scale which is formed by a plurality of equally spaced lines 47 which extend longitudinally over the whole length of the cap. The boring bar 1 is formed with a cutout 48 provided with a marker 49 which cooperates with the scale 47. The scale 47 permits an exact adjustment of the cutting tool 11a along its adjusting stroke $s$.

The adjusting screws 10a, 10b and 10c, respectively, shown in FIGS. 3, 8 and 11, are provided with a forwardly extending tubular elongation 51 formed with an outer thread 50 threadedly engaging in the inner screw thread 9a, 9b, 9c, respectively, formed in the rear portion of the tool holding member. This arrangement assures that the adjustment screw is already in its starting position respectively shown in FIGS. 3, 8 and 11, properly engaged with a plurality of screw turns in the thread formed in the tool holding member. The advancement of the cutting tool in the direction of the arrow A is limited by the tubular projection 51 which during turning of the adjustment screw in forward direction will finally abut against the abutment ring 29.

While the tool holding members 5 and 5a respectively shown in FIGS. 1 and 3, are held in fixed position relative to the bore bar 1 by the set screw 7, the arrangement shown in FIG. 8 permits an adjustment of the position of the tool holding member 5b in longitudinal direction, indicated by the arrow B, relative to the boring bar 1. This arrangement provides for a greater adjustment than the arrangements shown in FIGS. 1 and 3 so that the arrangement of FIG. 8 may be used advantageously for internal as well as for external machining work. The boring bar 1 is provided as shown in FIG. 8 with a bore 52 of uniform diameter in which the cylindrical tool holding member 5b having a uniform diameter $d_1$ is located adjustable in longitudinal direction as indicated by the arrow B. The tool holding member 5b is provided with a pin 53 extending substantially normal to the axis of the tool holding member and engaging with its projection end in a longitudinal groove 54 formed in the bore of the boring bar so that the tool holding member 5b is prevented from turning about its axis relative to the boring bar 1. The tool holding member 5b is clamped in the bore 52 by a set screw 55 which engages the tool holding member 5b through a pressure member 56.

It is also possible to properly clamp the tool holding member 5b in the bore 52 of the boring bar 1 by means of a clamping device as illustrated in FIG. 9, which comprises a clamping screw 57 and two pressure members 58 and 59 which are moved in opposite direction relative to each other by the clamping screw 57 and which respectively engage with curved portions 60 and 61 thereof the outer cylindrical surface of the tool holding member 5b.

The clamping sleeve 19b shown in FIG. 8 is not provided with longitudinal slots. The clamping sleeve has an outer diameter $d_5$ substantially equal to the diameter $d_1$ of the tool holding member 5b. This has the advantage to permit a considerable longitudinal adjustment of the tool holding member 5b in the bore 52 of the boring bar 1, whereby the clamping sleeve may be arranged in part or completely within the bore 52 of the bar. The clamping sleeve 19b is provided at the front end thereof with a pair of cutouts 22 and in addition thereto also on its cylindrical surface with a pair of opposite flats 62 for the adjustment of the clamping sleeve by a key or wrench.

The tool holding member 5b of the arrangement illustrated in FIG. 8 is provided at its rear end with an elongation 63 having an enlarged inner diameter $d_6$. The adjusting screw 10b has a cylindrical head 64 fitting in the bore of the elongation 63, and the head 64 has a length $l$ which is greater than the adjusting strokes $s$ of the cutting tool 11b. The head is provided on its outer surface with a scale 47 which cooperates with a marking 65 provided on the elongation 63.

While FIGS. 1, 3 and 8 illustrate the adjustable tool mounting arrangements arranged with the axis thereof substantially normal to the axis of the boring bar 1, FIGS. 7 and 10 illustrate that the adjustable tool mounting arrangement may also be arranged at an acute angle $\alpha$ with regard to the axis of the boring bar.

FIGS. 11–15 illustrates a further modification of the adjustable tool mounting arrangement according to the present invention. The modification illustrated in these figures differs from the previously described modification mainly by the specific clamping arrangement for clamping the cutting tool 11c adjacent the working end thereof in the tool holding member 5c. As best shown in FIGS. 11 and 13 the tool holding member 5c is provided at its front end therof, shown as the left end in FIGS. 11 and 13, with an inner cone surface 68 and rearwardly thereof with an inner screw thread 69 having a larger diameter than the longitudinal bore formed through the tool holding member 5c in longitudinal direction thereof. The rear portion of this bore is provided with an inner screw thread 9c into which the front portion of the adjusting screw 10c is threadedly engaged. The tool holding member 5c is provided with a rear elongation 63c formed with a bore of an enlarged diameter $d_6$ therethrough into which the head 46 of the adjusting screw 10c fits with a sliding fit. The head 46 of the adjustment screw 10c is provided with a scale 47 cooperating with a marking 65 provided adjacent the cutout 71 at the rear end of the tool holding member 5c. The main shaft portion 12c of the cutting tool 11c is slidingly guided in the unthreaded bore portion of the tool holding member 5c and the conical rear end 14 of the rear shaft portion 13c of the tool fits into a correspondingly shaped cavity 34 in the adjusting screw 10c. Arranged about the rear shaft portion 13c is a coil compression spring 27 which abuts with opposite ends thereof respectively against the abutment ring 26 at the rear end of the rear shaft portion 13c and against the abutment ring 29 slidably arranged on this rear shaft portion. The abutment ring 29 abuts with its peripheral surface portion against a shoulder 30c so that the compression spring 27 presses the cutting tool 11c in direction of the arrow XI against the adjustment screw 10c for the purpose clearly described above in connection with the previously described above in connection with the previously described modifications. A clamping sleeve 67 formed with an axial bore 74 therethrough, in which the front portion of the main shaft portion 12c is located, is provided at its rear end thereof with an outer screw thread threadedly engaging into the inner screw thread 69 formed in the front portion of the tool holding member 5c. The clamping sleeve 67 is formed with a longitudinally extending slot 73 therethrough, and provided at the front end thereof with an outer cone surface 70 which cooperates with the inner cone surface 68 formed in the front end of the tool holding member 5c to press the inner surface of the clamping sleeve tightly and substantially uniformly in radial direction against the outer surface of the major shaft portion 12c of the cutting tool during tightening of the clamping sleeve 67 by screwing the same inwardly into the tool holding member 5c. The clamping sleeve 67 is provided at its front end thereof with a pair of cutouts 22 for engagement with corresponding projections in a setting key.

In this arrangement the tool holding member 5c may have a substantially square cross section as best shown in FIG. 12 in which the elongated tool holding member is shown arranged in a corresponding square bore 72 formed in the boring bar 1c. A set screw 7c is provided which engages with its flat inner end one side face of the tool holding member 5c to clamp the latter securely in the bore 72 of the boring bar 1c.

It is, however, understood that the tool holding member 5c of the arrangement illustrated in the FIGS. 11 and 12 may also have a cylindrical cross section and be fitted in a corresponding cylindrical bore in the boring bar and fixed in position therein by a pointed set screw as for instance shown in FIG. 1 or by a clamping arrangement as for instance illustrated in FIG. 9. The bore in the boring bar 1c may have an axis normal to the axis of the boring bar or inclined at an acute angle thereto.

It will be understood that each of the elements described above, or two or more together, may also find a useful application in other types of adjustable tool mounting arrangements differing from the types described above.

While the invention has been illustrated and described as embodied in an adjustable tool mounting arrangement to be fitted into a bore of a boring bar, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An adjustable tool mounting arrangement comprising, in combination, an elongated tool holding member defining in its interior an elongated axial passage and being formed in the region of one end thereof with a screw thread; a cutting tool slidably arranged in said passage and having a working end projecting beyond the other end of said tool holding member; stop means located in said one end of said tool holding member and threadedly engaging said screw thread so as to be adjustable in axial direction; spring means operatively connected to said holding member and to said cutting tool for pressing the end of the latter opposite said working end thereof against said stop means to eliminate play between the engaging threads of holding member and stop means so that an exact axial adjustment of said tool by turning said stop means will subsequently not be disturbed by pressure on said working end; and means for clamping said tool uniformly in radial direction at the other end of said tool holding member.

2. An adjustable tool mounting arrangement comprising, in combination, an elongated tool holding member formed with an axial bore therethrough having an inner screw thread at one end thereof; a cutting tool slidably arranged in said bore and having a working end projecting beyond the other end of said tool holding member; stop means located in said bore and having an outer screw threadedly engaging said inner screw thread of said bore so as to be adjustable in axial direction; spring means operatively connected to said holding member and to said cutting tool for pressing the end of the latter opposite said working end thereof against said stop means to eliminate play between the engaging threads of holding member and stop means so that an exact axial adjustment of said tool by turning said stop means will subsequently not be disturbed by pressure on said working end; and means for clamping said tool uniformly in radial direction at the other end of said tool holding member.

3. An adjustable tool mounting arrangement comprising, in combination, an elongated tool holding member formed with an axial bore therethrough having an inner screw thread at one end thereof and a screw thread at the other end thereof; a cutting tool slidably arranged in said bore and having a working end projecting beyond the other end of said tool holding member; stop means located in said bore and having an outer screw thread threadedly engaging said inner screw thread of said bore so as to be adjustable in axial direction; spring means operatively connected to said holding member and to said cutting tool for pressing the end of the latter opposite said working end thereof against said stop means to eliminate play between the engaging threads of holding member and stop means so that an exact axial adjustment of said tool by turning said stop means will subsequently not be disturbed by pressure on said working end; and clamping means threadedly engaging said screw thread at said other end of said tool holding member, said clamping means having a cone surface having an axis coinciding with the axis of said bore and cooperating with a cone surface formed in said other end of said tool-holding member for clamping said tool in said other end of said tool holding member from all sides and in radial direction.

4. An adjustable tool mounting arrangement comprising, in combination, an elongated tool holding member formed with an axial bore therethrough having an inner screw thread at one end thereof and a screw thread at the other end thereof; a cutting tool slidably arranged in said bore and having a working end projecting beyond the other end of said tool holding member; means cooperating with said tool holding member and said tool for preventing turning of the latter relative to said tool holding member; stop means located in said bore and having an outer screw thread threadedly engaging said inner screw thread of said bore so as to be adjustable in axial direction; spring means operatively connected to said holding member and to said cutting tool for pressing the end of the latter opposite said working end thereof against said stop means to eliminate play between the engaging threads of holding member and stop means so that an exact axial adjustment of said tool by turning said stop means will subsequently not be disturbed by pressure on said working end; and clamping means threadedly engaging said screw thread at said other end of said tool holding member, said clamping means having a cone surface having an axis coinciding with the axis of said bore and cooperating with a cone surface formed in said other end of said tool holding member for clamping said tool in said other end of said tool holding member from all sides and in radial direction.

5. An adjustable tool mounting arrangement, comprising, in combination, an elongated cylindrical tool holding member formed with an axial bore therethrough and at a rear portion thereof with an inner screw thread, said tool holding member having at a front end thereof an outer cone surface and being formed with a longitudinal slot extending from said front end in rearward direction and with an outer screw thread located rearwardly of said cone surface; a cutting tool slidably arranged in said bore and having a working end projecting beyond said front end of said tool holding member and a rear end in said bore; an adjusting screw in said rear end of said tool holding member and threadedly engaging said inner screw thread so as to be adjustable in axial direction; spring means operatively connected to said holding member and said cutting tool for pressing the rear end of the latter against said adjusting screw to eliminate play between the engaging threads of holding member and adjusting screw so that an exact axial adjustment of said tool by turning said adjusting screw will subsequently not be disturbed by application of pressure on said working end; a clamping sleeve screw on said outer screw thread on said tool holding member and having an inner cone surface cooperating with said outer cone surface on said front end of said tool holding member for clamping the slotted portion of the latter tightly against said tool; and means cooperating with said tool holding member and said tool for preventing turning of the latter relative to said tool holding member.

6. An adjustable tool mounting arrangement comprising, in combination, an elongated cylindrical tool holding member formed with an axial bore therethrough and at a rear portion thereof with an inner screw thread, said tool holding member having at a front end thereof an outer cone surface and being formed with a longitudinal slot extending from said front end in rearward direction and with an outer screw thread located rearwardly of said cone surface; a cutting tool having a working end projecting beyond said front end of said tool holding member, a substantially cylindrical main shaft portion rearwardly of said working end and slidably located in said slotted front portion of said tool holding member and a rear shaft portion of smaller diameter than said main shaft portion; an abutment ring fixed to said rear shaft portion adjacent the rear end thereof; an adjusting screw in said rear end of said tool holding member and threadedly engaging said inner screw thread so as to be adjustable in axial direction; a compression coil spring wound about said rear shaft portion and engaging with one end thereof said abutment ring and being operatively connected at the other end to said tool holding member for pressing the rear end of said rear shaft portion against said adjusting screw to eliminate play between the engaging threads of holding member and adjusting screw so that an exact axial adjustment of said tool by turning said adjusting screw will subsequently not be disturbed by application of pressure on said working end; a clamping sleeve screwed on said outer screw thread on said tool holding member and having an inner cone surface cooperating with said outer cone surface on said front end of said tool holding member for clamping the slotted portion of the latter tightly against said tool; and means cooperating with said tool holding member and said tool for preventing turning of the latter relative to said tool holding member.

7. An adjustable tool mounting arrangement as set forth in claim 6 in which said clamping sleeve has an outer diameter substantially equal to the outer diameter of said tool holding member and being formed at a front face thereof with cutouts for engagement with a setting key.

8. An adjustable tool mounting arrangement as set forth in claim 7 in which said clamping sleeve is slotted in axial direction.

9. An adjustable tool mounting arrangement as set forth in claim 7 in which said clamping sleeve is formed with one slot extending in axial direction through the whole length of said sleeve and with a plurality of axial slots extending only partly therethrough.

10. An adjustable tool mounting arrangement as set forth in claim 6 in which said abutment ring is integral with said rear shaft portion and formed with an acute slot permitting threading of said coil spring through said slot onto said rear shaft portion.

11. An adjustable tool mounting arrangement comprising, in combination, an elongated cylindrical tool holding member formed with a stepped axial bore therethrough forming an inner shoulder facing the rear end of said tool holding member, said tool holding member being formed in a rear portion of said bore with an inner thread and said tool holding member having at a front end thereof an outer cone surface and being formed with a longitudinal slot extending from said front end in rearward direction and with an outer screw thread located rearwardly of said cone surface; a cutting tool having a working end projecting beyond said front end of said tool holding member, a substantially cylindrical main shaft portion rearwardly of said working end and slidably located in said slotted front portion of said tool holding member and a rear shaft portion of smaller diameter than said main shaft portion; an abutment ring fixed to said rear shaft portion adjacent the rear end thereof; a second abutment ring slidably arranged on said rear shaft portion and abutting against said shoulder; an adjusting screw in said rear end of said tool holding member and threadedly engaging said inner screw thread so as to be adjustable in axial direction; a compression coil spring wound about said rear shaft portion and engaging with opposite ends thereof said abutment rings, respectively, for pressing the rear end of said rear shaft portion against said adjusting screw to eliminate play between the engaging threads of holding member and adjusting screw so that an exact axial adjustment of said tool by turning said adjusting screw will subsequently not be disturbed by application of pressure on said working end; a clamping sleeve screwed on said outer screw thread on said tool holding member and having an inner cone surface cooperating with said outer cone surface on said front end of said tool holding member for clamping the slotted portion of the latter tightly against said tool; and means cooperating with said tool holding member and said tool for preventing turning of the latter relative to said tool holding member.

12. An adjustable tool mounting arrangement comprising, in combination, an elongated cylindrical tool holding member formed with an axial bore therethrough and at a rear portion thereof with an inner screw thread, said tool holding member having at a front end thereof an outer cone surface and being formed with a longitudinal slot extending from said front end in rearward direction and with an outer screw thread located rearwardly of said cone surface; a cutting tool having a working end projecting beyond said front end of said tool holding member, a substantially cylindrical main shaft portion rearwardly of said working end and slidably located in said slotted front portion of said tool holding member and a rear shaft portion of smaller diameter than said main shaft portion and having a conical rear end; an abutment ring fixed to said rear shaft portion adjacent the rear end thereof; an adjusting screw in said rear end of said tool holding member and threadedly engaging said inner screw thread so as to be adjustable in axial direction, said adjusting screw being formed in a front end thereof with a conical cavity matching said conical rear end of said cutting tool; a compression coil spring wound about said rear shaft portion and engaging with one end thereof said abutment ring and being operatively connected at the other end to said tool holding member for pressing the rear end of said rear shaft portion against said adjusting screw to eliminate play between the engaging threads of holding member and adjusting screw so that an exact axial adjustment of said tool by turning said adjusting screw will subsequently not be disturbed by application of pressure on said working end; a clamping sleeve screwed on said outer screw thread on said tool holding member and having an inner cone surface cooperating with said outer cone surface on said front end of said tool holding member for clamping the slotted portion of the latter tightly against said tool; and means cooperating with said tool holding member and said tool for preventing turning of the latter relative to said tool holding member.

13. An adjustable tool mounting arrangement comprising, in combination, an elongated cylindrical tool holding member having a main portion and a rear end portion of a smaller outside diameter than said main portion, said tool holding member being formed with an axial bore therethrough formed at a rear portion thereof with an inner screw thread and said tool holding member having at a front end thereof an outer cone surface and being formed with a longitudinal slot extending from said front end in rearward direction and with an outer screw thread located rearwardly of said cone surface; a cutting tool having a working end projecting beyond said front end of said tool holding member, a substantially cylindrical main shaft portion rearwardly of said working end and slidably located in said slotted front portion of said tool holding member and a rear shaft portion of smaller diameter than said main shaft portion; an abutment ring fixed to said rear shaft portion adjacent the rear end thereof; an adjusting screw in said rear end of said tool holding member and threadedly engaging said inner screw thread so as to be adjustable in axial direction; a cap integral with said adjusting screw encompassing said rear end portion of said tool holding member, said cap having a length greater than the adjustment stroke for said adjusting screw and an outer diameter slightly smaller than the outer diameter of said main portion of said tool holding member; a compression coil spring wound about said rear shaft portion and engaging with one end thereof said abutment ring and being operatively connected at the other end to said tool holding member for pressing the rear end of said rear shaft portion against said adjusting screw to eliminate play between the engaging threads of holding member and adjusting screw so that an exact axial adjustment of said tool by turning said adjusting screw will subsequently not be disturbed by application of pressure on said working end; a clamping sleeve screwed on said outer screw thread on said tool holding member and having an inner cone surface cooperating with said outer cone surface on said front end of said tool holding member for clamping the slotted portion of the latter tightly against said tool; and means cooperating with said tool holding member and said tool for preventing turning of the latter relative to said tool holding member.

14. An adjustable tool mounting arrangement as set forth in claim 13 in which said cap is provided with a scale comprising a plurality of lines extending longitudinally through the whole length of said cap and being equally spaced from each other about the periphery of said cap.

15. An adjustable tool mounting arrangement as set forth in claim 6 in which said adjusting screw includes a hollow elongation partly encompassing said rear shaft portion of said cutting tool and being provided with an outer screw thread.

16. An adjustable tool mounting arrangement as set forth in claim 6 in which said tool holding member is formed rearwardly of said bore portion provided with said inner screw thread with an elongation having an enlarged bore of an inner diameter greater than that of said bore and in which said adjusting screw is provided with a head fitting in said enlarged bore of said elongation, said head having an axial length greater than the adjustment stroke of said adjusting tool and being provided around the circumference thereof with a scale.

17. An adjustable tool mounting arrangement comprising, in combination, an elongated tool holding member formed with an elongated bore therethrough having at a front portion of said member a larger diameter than the rearwardly extending portion of said bore, said elongated tool holding member being formed at the front end of said bore with an inner cone surface having its apex rearwardly of said front end and said tool holding member being formed in said large diameter portion of said bore as well as in a rear portion of said bore with an inner screw thread; a cutting tool having a working end projecting beyond said front end of said tool holding member, a substantially cylindrical main shaft portion rearwardly of said working end and extending through said bore portion of larger diameter into said rearwardly extending bore portion to be slidably guided in the latter and a rear shaft portion of smaller diameter than said main shaft portion; an abutment ring fixed to said rear shaft portion adjacent the rear end thereof; an adjusting screw in said rear portion of said bore and threadingly engageing said inner screw thread so as to be adjustable in axial direction; a coil spring wound about said rear shaft portion and engaging with one end thereof said abutment ring and being operatively connected at the other end thereof to said tool holding member for pressing the rear end of said rear shaft portion against said adjusting screw; and a clamping sleeve having at a rear portion thereof an outer screw thread threadedly engaging said inner screw thread formed in said large diameter portion of said bore of said tool holding member, said clamping sleeve being formed with a longitudinal slot extending through the length thereof and having at a front end thereof a conical head engaging said inner cone surface at the front end of said bore so that said clamping sleeve will be tightly clamped against said main shaft portion of said cutting tool during inward threading of said sleeve.

18. An adjustable tool mounting arrangement as set forth in claim 17 in which said tool holding member has a substantially square cross section.

19. In an adjustable tool mounting arrangement, in combination, an elongated tool holding member formed with an elongated bore therethrough having a front portion of a larger diameter than a rearwardly extending portion of said bore, said elongated tool holding member being formed at said front portion of said bore with an inner cone surface and said tool holding member being formed at said large diameter portion of said bore as well as in a rear portion of said bore with an inner screw thread; a cutting tool having a working end projecting beyond said front end of said tool holding member and extending with the remainder thereof into said bore to be slidably guided in said bore portion of smaller diameter; an adjusting screw located in the rear portion of said bore and threadedly engaging said inner screw thread formed therein for adjusting said tool in longitudinal direction relative to said screw holding member; spring means operatively connected to said tool holding member and to said cutting tool for pressing the end of the latter opposite said working and against said adjusting screw to eliminate play between the engaging threads of holding member and adjusting screw so that an exact axial adjustment of said tool by turning said adjusting screw will subsequently not be disturbed by pressure on said working end; and a clamping sleeve having at a rear portion thereof an outer screw thread threadedly engaging said inner screw thread formed in said large diameter portion of said tool holding member, said clamping sleeve being formed with a longitudinal slot extending through the length thereof and having a conical head engaging said inner cone surface at the front portion of said bore so that said clamping sleeve will be tightly clamped against the outer surface of said cutting tool during turning of said sleeve.

20. An adjustable tool mounting arrangement as set forth in claim 1 and including a boring bar formed with a transverse bore therethrough in which said elongated tool holding member is located, and means for clamping said tool holding member in said bore of said bar.

References Cited by the Examiner

UNITED STATES PATENTS 2,793,547  5/57  Benjamin et al.

FOREIGN PATENTS 1,100,125  9/55  France.

WILLIAM W. DYER, JR., *Primary Examiner.*